Jan. 20, 1925.
W. C. STEVENS
1,524,002
SPREADER FOR TIRE MAKING MACHINES
Original Filed May 14, 1919
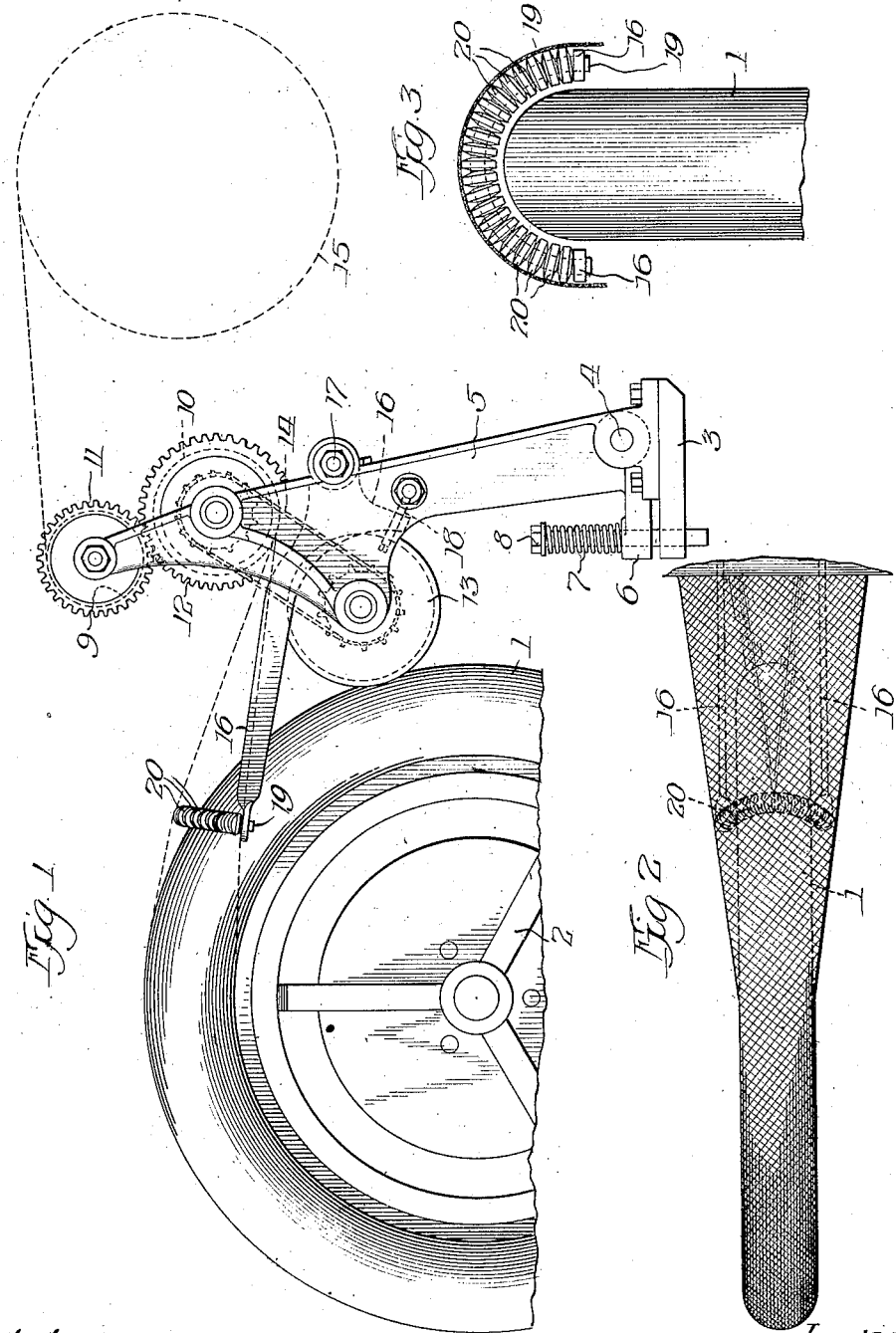

Patented Jan. 20, 1925.

1,524,002

UNITED STATES PATENT OFFICE.

WILLIAM C. STEVENS, OF AKRON, OHIO. ASSIGNOR TO THE FIRESTONE TIRE AND RUBBER COMPANY, OF AKRON, OHIO, A CORPORATION OF OHIO.

SPREADER FOR TIRE-MAKING MACHINES.

Application filed May 14, 1919, Serial No. 297,067. Renewed May 6, 1924.

*To all whom it may concern:*

Be it known that I, WILLIAM C. STEVENS, a citizen of the United States, residing at Akron, in the county of Summit, State of Ohio, have invented certain new and useful Improvements in Spreaders for Tire-Making Machines, of which the following is a specification.

This invention relates to a device adapted for insertion between the stretching rolls and the core on a tire making machine and is designed to remove the longitudinal wrinkles which occur in stretching a flat piece of fabric from a longitudinal roll to a transversely curved core. The device forming the subject matter of this invention relates only to the application of the fabric to the core in unwrinkled condition, the skirts or edges of the fabric being free to be smoothed and shaped to the core by any preferred mechanism, not shown.

In the drawings accompanying this application is shown one form of the invention, it being understood that changes or modifications may be made without departing from the essence of the invention.

Fig. 1 is a side elevation of a stretching mechanism and a core showing the arrangement of the various parts.

Fig. 2 is a plan view.

Fig. 3 is a view looking into the spreader.

The core on which the tire is to be built is designated by the numeral 1 and is supported and rotated by a chuck 2 during the stretching and shaping operation, as is understood by those familiar with the art. The frame of the tire making machine is indicated by the numeral 3 on which are pivots, one being shown at 4 on which is supported a swinging frame 5. The lower end of this frame is provided with a lug or foot 6 which receives a cushioning spring 7 surrounding and held in place by a bolt 8, secured in the frame of the machine.

In the upper end of the swinging frame 5 is carried a pair of stretching rolls, the upper one being designated by the numeral 9 and the lower by the numeral 10. The two rolls are geared together by gears 11 and 12 on the rolls respectively. The lower stretching roll is driven at a definite peripheral speed less than the speed of the core whereby the fabric is stretched by a core contacting roll 13 revolving in the frame and connected to the roll 10 by sprocket gearing indicated by the numeral 14.

The fabric is drawn from a supply roller 15 by the rotation of the core and passes around the rollers 9 and 10 and onto the core. The flat fabric as it leaves the roll 10 will tend to form wrinkles and to remove these wrinkles, it is necessary to provide some form of spreading device. Various forms of spreading devices have been devised which have performed their work in a more or less satisfactory manner, but my new form of spreader is believed to be superior to any heretofore in use as it eliminates entirely the necessity for any stretching by hand on the part of the operator.

The spreader is carried on a pair of arms 16 which are pivoted to the swinging frame, as at 17, being provided with adjustable stops 18 which limit the downward movement. The ends of the arms extend on either side of the core and are connected by an arched rod 19 which conforms closely to the curvature of the core. On this rod is carried a plurality of loosely mounted rollers 20 over which the fabric is drawn. It will be noted that the plane of the arch is oblique to the radius of the core so that the crown is thrown forward with respect to the fabric as it passes over the spreader. The planes of the several rollers are radial to the cross section of the core, as shown in Fig. 3, but owing to the tilt of the arch, as explained, the several rollers will diverge from the center of the fabric. In other words, the rollers spread fanwise from the center of the fabric. The action derived from this arrangement of rollers is to spread the fabric transversely from the center and remove the longitudinal wrinkles. This action is performed while the fabric is brought to the curved condition it assumes while on the tire. I am aware of prior constructions in which spreading shafts or rollers have been utilized, but so far as known to me, the spreading shafts have been straight or flat and have given little or no satisfactory results in removing the wrinkles, it being necessary for the fabric to assume its curved condition after leaving the spreader shaft. On the other hand the form of spreading device shown herein acts upon the fabric while it is in curved condition just prior to the point at which it passes onto the core.

It is obvious that changes and modifications may be made in the form of the invention, and such changes may be in details and will not offset the substance of the invention. Such modifications as are within the scope of this invention are intended to be covered hereby and fall within the appended claims.

I claim:

1. In a tire making machine the combination of a stretching roller, a core, a support, a series of rollers arranged on the support in an arc surrounding the tread of the tire, and mounted fanwise to spread the fabric from the center toward the edges before it touches the core.

2. In a tire making machine, the combination of a stretching roller, a core, a support, a curved rod on the support partially surrounding the core and located beneath the fabric, the upper point of said rod being advanced with respect to the fabric and a series of rollers on said rod.

3. In a tire making machine, the combination of a stretching roller, a core, a support, a curved rod on the support partially surrounding the core, the upper point of said rod being advanced with respect to the fabric and a series of rollers on said rod, said rollers being arranged to diverge from the center of the fabric and remove the longitudinal wrinkles before it touches the core.

4. In a tire-making machine the combination with a rotatable tire-core of a series of rollers rotatably mounted substantially as a transverse arch about the core and in such relation to the latter as to be adapted to have fabric led thereover onto the core to shape the fabric approximately to the shape of the core just prior to its attachment thereto.

5. In a tire-making machine the combination with a rotatable tire-core of an arched rod transversely embracing the core and a plurality of rollers journaled on said rod, said rollers being adapted to have fabric led thereover onto the core to shape the fabric approximately to the shape of the core just prior to its attachment thereto.

6. A tire-making machine comprising a rotatable tire core, fabric supply means, and a series of rollers arranged in an arc transversely embracing the core, said series of rollers being so supported and arranged with respect to the core and said supply means that fabric may be led from the latter thereover and shaped approximately to the shape of the core just prior to its attachment thereto.

WILLIAM C. STEVENS.